United States Patent

[11] 3,587,188

[72] Inventors Michele Dietrich
Lafayette Hill;
William P. Godley, Maple Glen, Pa.
[21] Appl. No. 774,025
[22] Filed Nov. 7, 1968
[45] Patented June 28, 1971
[73] Assignee

[54] MESSAGE DISPLAY APPARATUS

2 Claims, 3 Drawing Figs.

[52] U.S. Cl. .......... 40/336
[51] Int. Cl. .......... G09f 3/00
[50] Field of Search .......... 40/336, 16.4

[56] References Cited

UNITED STATES PATENTS 2,540,908 2/1951 Pinkerman .......... 40/(336X)
2,795,877 6/1957 Falk .......... 40/336
2,981,021 4/1961 Clark .......... 40/336

*Primary Examiner*—Robert W. Michell
*Assistant Examiner*—L. R. Oremland
*Attorneys*—Arthur H. Swanson and Lockwood D. Burton ABSTRACT: Apparatus is disclosed for attachment to the base of a standard desk-type telephone set. The apparatus includes a frame member for insertion into the finger cavity provided in the base of such a telephone set. The frame member includes a flap for engaging a downward projecting lip located on the telephone base at the entrance to the cavity, and further includes resilient support means operative to position the flap in locking engagement with the lip. Joined to the frame member is an arm suitable for carrying an advertising message. The arm also has clip means for holding a memorandum.

INVENTORS.
MICHELE DIETRICH
WILLIAM P. GODLEY
BY Lockwood D. Burton
ATTORNEY.

MESSAGE DISPLAY APPARATUS

The present invention relates to message display apparatus. and more particularly to message display apparatus, for use with telephone sets. Such display apparatus may be attached to or mounted upon telephone sets and is used for carrying advertising messages and/or memoranda.

It is an object of the present invention to provide message display apparatus which is characterized by having novel structure for locking attachment to the base of a telephone set.

It is further an object of the present invention to provide message display apparatus as set forth characterized as being adapted for insertion into the finger cavity providing in the rear portion of the base of a standard desk-type telephone set.

It is an additional object of the present invention to provide message display apparatus as set forth having clip means for receiving and holding memoranda.

In accomplishing these and other objects, there has been provided in accordance with the present invention message display apparatus comprising a frame member for insertion into a finger cavity provided in the rear portion of the base of a standard desk-type telephone set. The frame member includes lock means for engaging the downward projecting lip located on the telephone base at the entrance to the finger cavity. Further included in the frame member are resilient support means which operate to position the lock means in engagement with the lip whenever the frame member is inserted in the finger cavity. An upwardly extending arm is joined to the frame member for carrying an advertising message. The arm includes clip means for receiving and holding a memorandum.

A better understanding of the invention may be had from the following detailed description when read in connection with the accompanying drawings in which.

Figure 1:
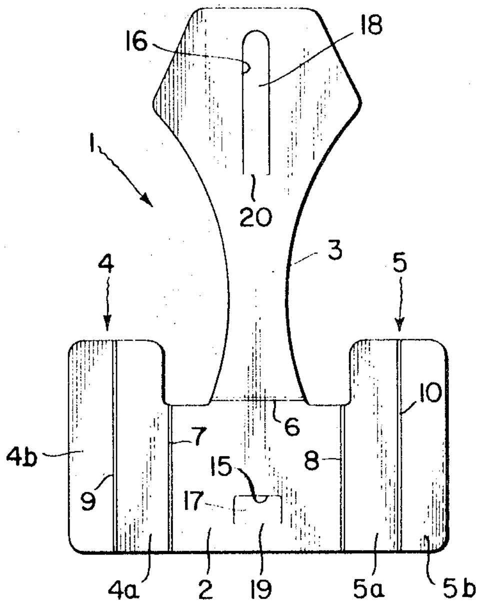
FIG. 1 is a top view of a unitary piece of material from which may be formed a message display apparatus according to the present invention.

Referring to the drawings in more detail, there is shown in FIG. 1 a unitary piece of sheet material 1, such as a suitable plastic or metal material. A criterion of suitability is that the material be capable of being folded to produce a resilient bend, without fracturing. The material 1 is formed in a predetermined shape comprising a rectangular planar surface 2, an arm 3 having a principal axis, and substantially rectangular legs 4 and 5. The arm 3 is joined with one side of the planar surface 2 and a crease 6 is impressed along the line of intersection between the surface 2 and the arm 3. The principal axis of the arm 3 is perpendicular to the crease 6 and intersects the abutting side of the planar surface 2 substantially at its center. The arm 3 is formed to have the majority of its surface area located near its end remote from the crease 6.

The legs 4 and 5 are each joined with opposite sides of the planar surface 2, the legs being symmetrically situated with respect to the arm 3. Parallel creases 7 and 8 are impressed in the material 1 along the lines of intersection between the surface 2, and the legs 4 and 5, respectively. A crease 9, parallel to the crease 7, is impressed longitudinally in the leg 4, thereby dividing the leg 4 into substantially equal upper and lower portions 4*a* and 4*b*, respectively. Likewise, a crease 10, parallel to the crease 8, is impressed in the leg 5 to divide the leg 5 into upper and lower portions 5*a* and 5*b*, respectively.

The creases 6–10 are impressed in both sides of the material 1 to enable the material 1 to be readily bent there along. Cuts 15 and 16 are further made, as by punching, through the material 1 to form a flap 17 and a clip 18. A line 19, shown as a broken line in FIG. 1, defines the boundary of the flap 17. The line 19 is perpendicular to the creases 7 and 8, and the flap 17 is located substantially equidistant between these creases. The boundary of the clip 18 is defined by a line 20, shown as a broken line in FIG. 1. The line 20 is substantially parallel with the crease 6. The clip 18 longitudinally extends along the principal axis of the arm 3, and is located proximate to the end of the arm 3 which is remote from the crease 6.

Figure 2:
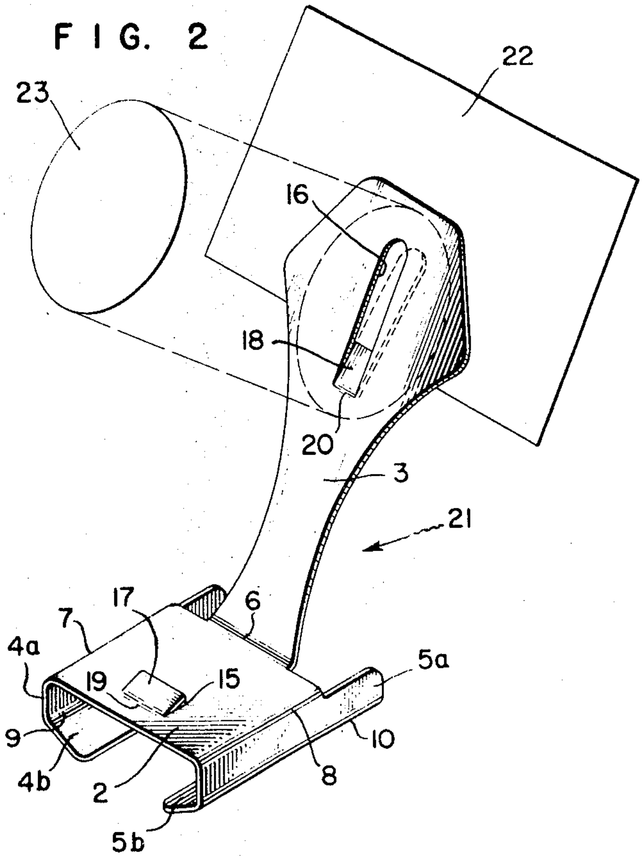
FIG. 2 is a perspective view of a message display apparatus according to the present invention made from the unitary piece of material of FIG. 1.

A message display apparatus 21 made from the unitary piece of material 1 is shown in the FIG. 2. The material 1 is bent at the creases 7 and 8, respectively, so that the leg upper portions 4*a* and 5*a* each make substantially right angles with the planar surface 2. The legs 4 and 5 are also bent at the creases 9 and 10 so that the leg lower portions 4*b* and 5*b* extend towards each other, and each make an obtuse angle with the leg upper portions 4*a* and 5*a*, respectively. The flap 17 on the planar surface 2 is bent along the line 19 to extend upward with relation to the surface 2.

Additionally, the material 1 is bent at the crease 6 so that the arm 3 extends upward, for example at an angle on the order of 45° to 90° with respect to the planar surface 2. The clip 18 is very slightly bent at the line 20 backward with respect to the arm 3. The clip 18 is shown in FIG. 2 gripping and supporting a card or memorandum 22, such as a brief telephone message. The dotted circle shown in FIG. 2 and the lines extending therefrom indicate the location on the arm 3 whereat a suitable or selected advertising message, slogan or symbol 23 may be conveniently affixed.

Figure 3:
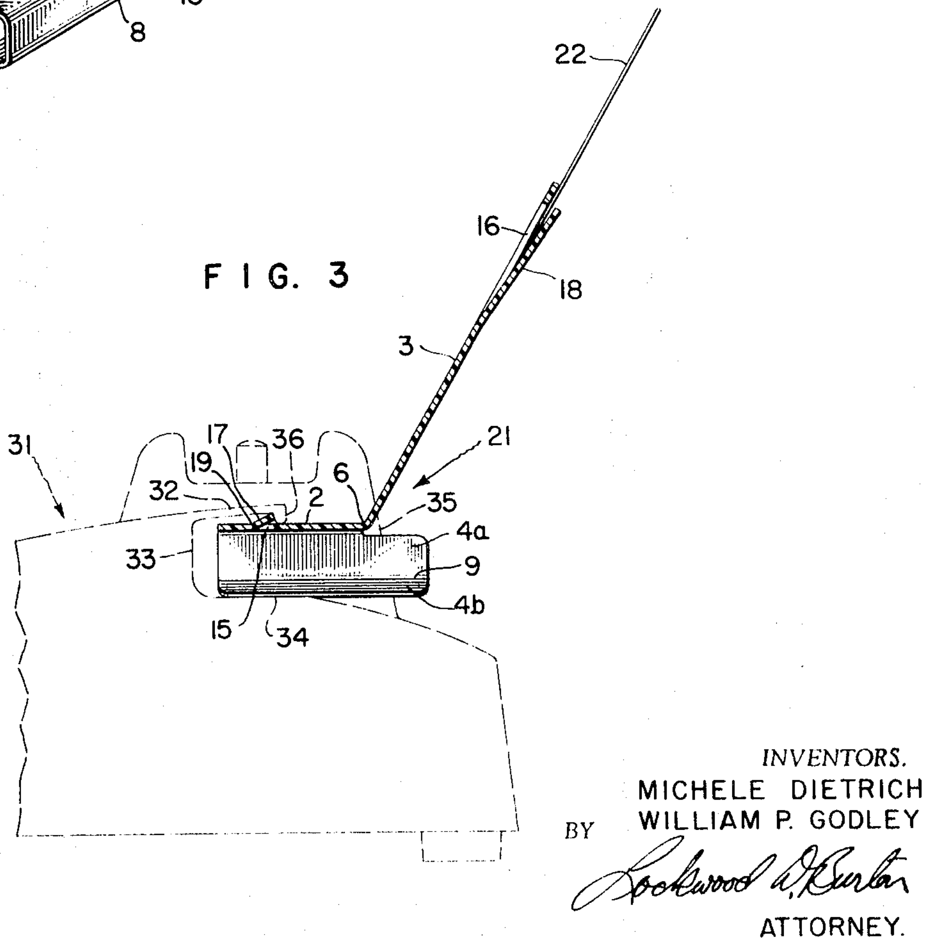
FIG. 3 is a section view of the base of a standard desk-type telephone set with the message display apparatus of FIG. 2 in position thereon.

FIG. 3 shows a suitably dimensioned message display apparatus 21 in situ on the base of a standard desk-type telephone set 31. The apparatus 21 is inserted in a finger cavity located in the rear portion of the base of the telephone set 31 which cavity is defined by walls 32, 33, 34 and 35. The cavity is provided in the telephone set as a finger-gripping means whereby the telephone set 31 may be picked up. A downward extending lip 36 is located on the wall 32 at the entrance to the defined cavity.

Concerning the positioning of the apparatus 21 on the telephone set 31, it is noted that the planar surface 2 in conjunction with the legs 4 and 5 provide a frame member for insertion into the finger cavity in the base of the telephone set 31. The creases 7—10 in the material 1 lend rigidity to this frame member. The legs 4 and 5 with the obtuse angle formed between their upper and lower portions provide resilient support means which operate to support the apparatus 21 in the cavity and to resiliently urge the flap 17 into engagement with the lip 36. The flap 17 thereby provides lock means which attaches and holds the apparatus 21 in situ on the telephone set 31.

It is noted that while the preferred embodiment of the present invention described herein is constructed from a unitary piece of sheet material, the invention is not limited to such a construction. The arm, legs and planar surface for example could be made of separate pieces and the assembled to form a message display apparatus in accordance with the present invention.

Thus, there has been provided message display apparatus for locking attachment to the base of a standard desk-type telephone and having clip means for receiving and holding memoranda.

We claim:

1. A message display apparatus for attachment to a desk-type telephone set which has a finger cavity substantially rectangular in cross section with a lip projecting downwardly from the upper surface of the cavity, said message display apparatus comprising:

a frame member of resilient sheet material having an upper planar surface with a resilient flap projecting upwardly from said planer surface; said flap being adapted to engage said lip upon insertion of the frame; said planer surface terminating at each side thereof in a downwardly extending leg of a length substantially equal to the height of said finger cavity; and an upwardly extending arm joined with said frame member, said arm being adapted for displaying a message.

2. The invention as set forth in claim 1 wherein each of said downwardly extending legs is of a length at least equal to the height of said finger cavity.